United States Patent
Springs

(10) Patent No.: US 6,637,355 B2
(45) Date of Patent: Oct. 28, 2003

(54) DEVICE FOR FILLING AND LEVELING DIVOTS

(75) Inventor: Fred Springs, Mount Prospect, IL (US)

(73) Assignee: Divotender, Inc., Skokie, IL (US)

( * ) Notice: Subject to any disclaimer, the term of this patent is extended or adjusted under 35 U.S.C. 154(b) by 27 days.

(21) Appl. No.: 10/002,098

(22) Filed: Nov. 28, 2001

(65) Prior Publication Data

US 2002/0092451 A1 Jul. 18, 2002

Related U.S. Application Data

(60) Provisional application No. 60/250,893, filed on Nov. 29, 2000.

(51) Int. Cl.[7] .................................................. A01C 5/02
(52) U.S. Cl. ........................................ 111/95; 222/175
(58) Field of Search ............................... 111/95, 92, 96, 111/106; 172/371, 372, 373; 222/191, 307, 505, 175

(56) References Cited

U.S. PATENT DOCUMENTS

| | | | | |
|---|---|---|---|---|
| 774,711 A | * | 11/1904 | Thompson | 111/95 |
| 788,717 A | * | 5/1905 | Hart | 111/95 |
| 909,289 A | * | 1/1909 | Grisell et al. | 111/92 |
| 954,576 A | * | 4/1910 | Logan | 111/95 |
| 1,084,564 A | * | 1/1914 | Sertic | 111/95 |
| 2,599,118 A | * | 6/1952 | McMillan | 222/175 |
| 2,656,071 A | * | 10/1953 | Smith | 222/133 |
| 2,860,586 A | * | 11/1958 | Nozell | 111/92 |
| 3,150,620 A | * | 9/1964 | Popplewell | 111/106 |
| 3,260,417 A | * | 7/1966 | Paxson | 222/191 |
| 4,123,980 A | * | 11/1978 | Winston | 111/92 |
| 4,461,225 A | * | 7/1984 | Patrick | 111/95 |
| 5,052,314 A | * | 10/1991 | Leini | 111/106 |
| 5,170,729 A | * | 12/1992 | Benner | 111/7.2 |
| 5,339,994 A | * | 8/1994 | Nuila | 222/175 |
| 5,471,939 A | * | 12/1995 | Chancey | 111/107 |
| 5,584,256 A | * | 12/1996 | Fleming | 111/92 |

FOREIGN PATENT DOCUMENTS

| | | | | |
|---|---|---|---|---|
| AU | 147552 | * | 8/1950 | 111/95 |
| DE | 631757 | * | 6/1936 | 111/95 |
| GB | 883371 | * | 11/1961 | 111/95 |

* cited by examiner

Primary Examiner—Victor Batson
(74) Attorney, Agent, or Firm—Thomas R. Vigil; Welsh & Katz, Ltd.

(57) ABSTRACT

The device for filling and leveling grass surfaces comprises a tube having an upper end and a lower end; a planar bottom chute extending across the lower end of the tube, the planar bottom chute being pivotaly mounted to the lower end of the tube; a handle assembly mounted at an upper end of the tube; a linkage mechanism connected between the handle assembly and the planar bottom chute; and a biasing device for biasing the handle assembly to exert a pulling force on the linkage mechanism to hold the planar bottom chute closely against the lower end of the tube whereby an operator can manipulate the handle assembly for moving the planar bottom chute toward and away from the lower open end of the tube for opening and closing the tube to facilitate dispensing of grass seed or a grass seed and earth mixture from the lower end of the tube and can level the seed or seed mixture with seed planar bottom chute.

12 Claims, 4 Drawing Sheets

DEVICE FOR FILLING AND LEVELING DIVOTS

BACKGROUND OF THE INVENTION

1. Field of the Invention

The present invention relates to a device for filling and leveling divots created in turf or grass, such as divots created by golfers.

2. Description of the Prior Art

Heretofore devices have been proposed for dispensing seed to an open area in a grass surface, such as a divot. Examples of such previously proposed devices are disclosed in the following U.S. patents:

| U.S. Pat. No. | PATENTEE |
| --- | --- |
| 4,206,714 | Walsh |
| 5,037,008 | Nockleby |
| 5,131,570 | Sawyer, III |

SUMMARY OF THE INVENTION

According to the invention there is provided a device for filling and leveling open areas, divots, in a grass surfaces comprising a tube having an upper end and a lower end, a planar bottom chute extending across the lower end of the tube, the planar bottom chute being pivotly mounted to the lower end of the tube, a handle assembly mounted at the upper end of the tube, a linkage mechanism connected between the handle assembly and the planar bottom chute, biasing means biasing the handle assembly to exert a pulling force on the linkage mechanism to hold the planar bottom chute closely against the lower end of the tube whereby an operator can manipulate the handle assembly for moving the planar bottom chute toward and away from the lower end of the tube for opening and closing the tube to facilitate dispensing of grass seed or a grass seed and earth mixture from the lower end of the bottom chute, and can level the seed or seed mixture with the planar bottom chute.

DETAILED DESCRIPTION OF THE INVENTION

Figure 1:
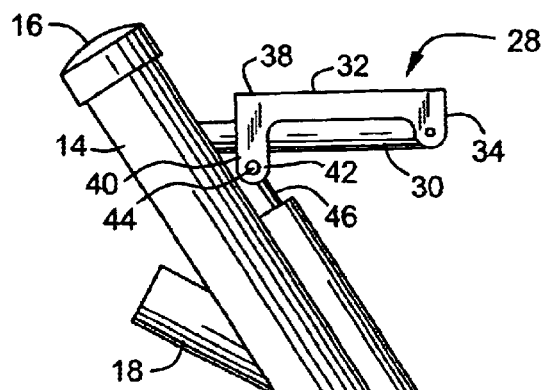
FIG. 1 is a side elevational view of the divot filling and leveling device of the present invention in a closed position.

Referring now to the drawings in greater detail, there is illustrated in FIG. 1 a device 10 for filling and leveling divots in open areas in a grass surfaces, such as divots on a golf course. As shown, the device 10 includes a main tube 12 in which a grass seed or grass seed mixture is stored. An upper end 14 of the tube 12 is shown closed with a cap 16.

It will be understood that to enable an operator to fill more divots with grass seed or a grass seed mixture, the cap 16 can be replaced by a connector (not shown), or a side port 18 can be provided, which is connected to a flexible hose (not shown) which then extends to a receptacle, such as a generally square shaped box which is mounted in a backpack that an operator can wear on his back.

The side port 18 angles upwardly from a central axis of the tube 12.

A lower end 20 of the tube 12 has a short, smaller-in-diameter, end section 22 fixed thereto and extending downwardly to an inclined oval-shaped end surface 24 of the end section 22.

Pivotally connected to the end section 22 is a planar bottom chute 26 which has a U or channel shaped cross section.

Figure 5:
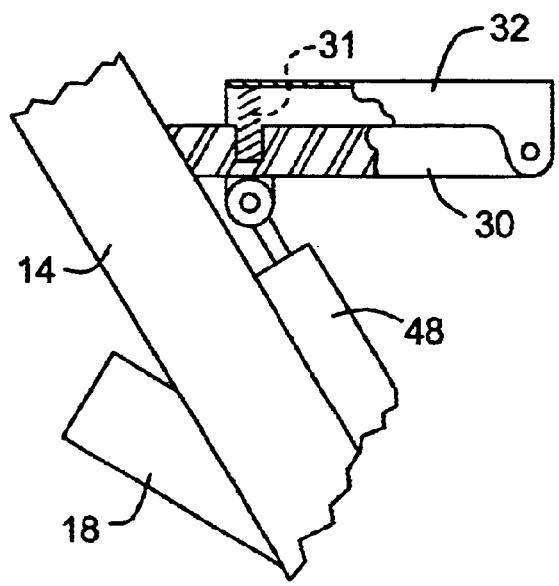
FIG. 5 is an enlarged view of the handle assembly in a bottom chute closed position with portions broken away.
Figure 6:
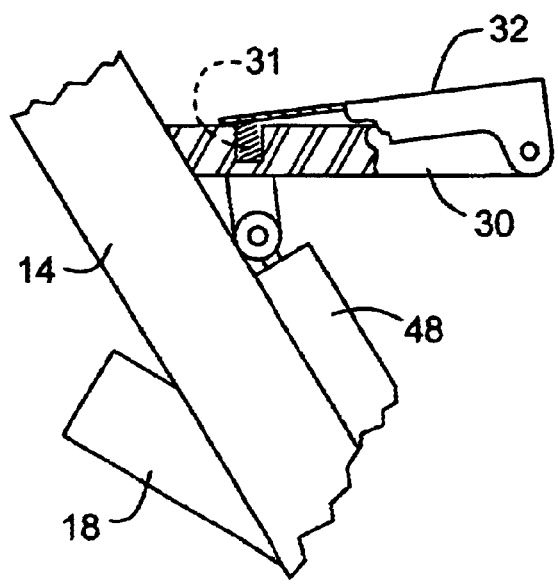
FIG. 6 is an enlarged view of the handle assembly in a bottom chute open position with portions broken away.

At the upper end 14 of the tube 12 is mounted a handle assembly 28 which includes a strut 30 which is rigidly fixed to the tube 12 and extends outwardly at an angle to the axis of the tube 12 so that an operator gripping the handle assembly 28 will hold the tube 12 at an angle as shown in FIG. 1. The handle assembly 28 further includes an arm 32 which is pivotally connected at its outer end 34 to an outer end 36 of the strut 30. The arm 32 has a generally U or channel shaped cross section so it can straddle the strut 30. A compression spring 31 is situated between the strut 30 and the arm 32 so that the compression spring urges the arm 32 away from the strut 30 as shown in FIGS. 5 and 6. At an inner end 38 of the arm can 32 are two depending lugs 40 which can move upwardly and downwardly relative to the strut 30 on either side of the strut 30.

The lugs 40 extend downwardly to a lower end 42 which have mounted therebetween a pivot pin 44. The pivot pin 44 is also connected to a linkage member 46 which can be an elongate rod 46 which is received within a cover 48 that tube-shaped, if desired. The cover 48 is fixed to an outer surface 50 of the tube 48.

A lower end 52 of the linkage rod 46 is pivotally connected to an upper end 54 of the planar bottom chute 26.

Figure 2:
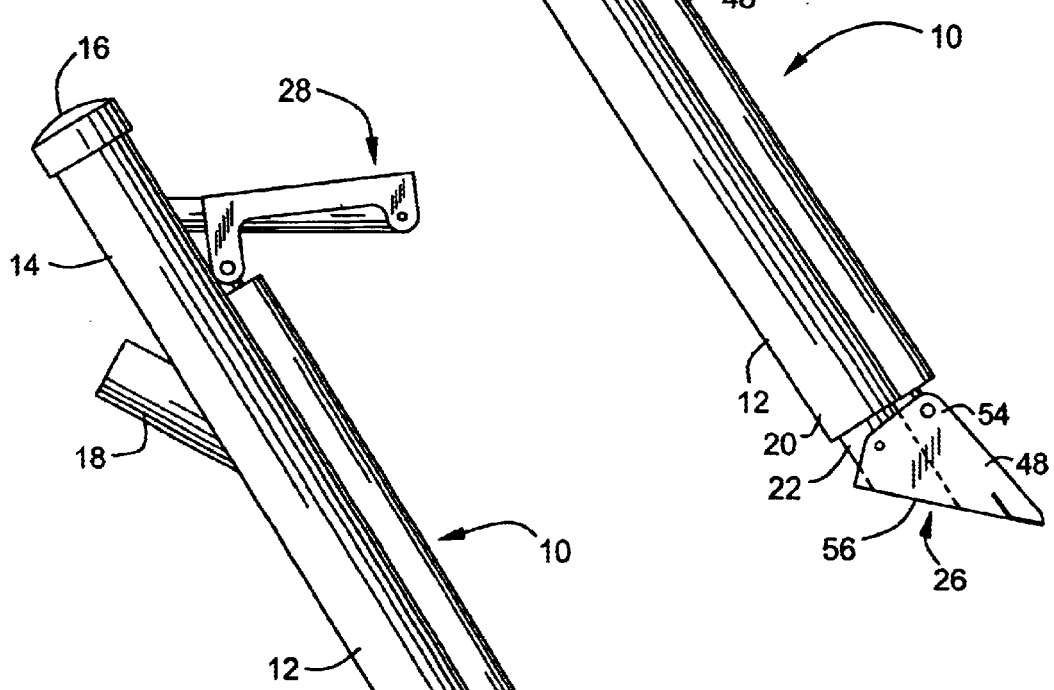
FIG. 2 is a side elevational view of the divot filling and leveling device of the present invention in an open position.

With reference to FIG. 2, it will be understood that squeezing of the handle assembly 28 pushes the arm 32 downwardly against the compression spring and over the strut 30 and in so doing pushes the linkage rod 46 downwardly to move a bottom plate 56 of the planar bottom chute 26 away from the lower oval-shaped end surface 24 defining a lower exit end of the tube 12 thereby to release the grass seed or mixture of seed from the tube 12 over an open area or divot.

Figure 3:
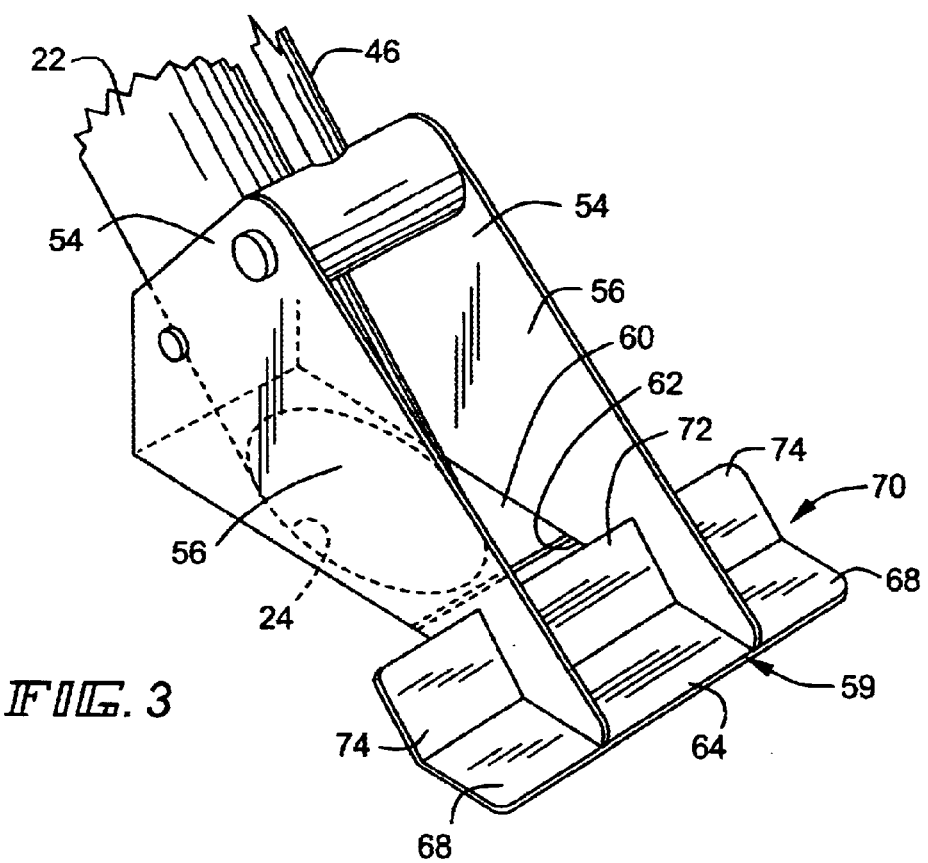
FIG. 3 is an enlarged perspective view of the planar bottom chute which is pivotly mounted at a lower end of a tube of the filling and leveling device and shows a transversely extending trowel formation at a front end of the planar bottom chute.
Figure 4:
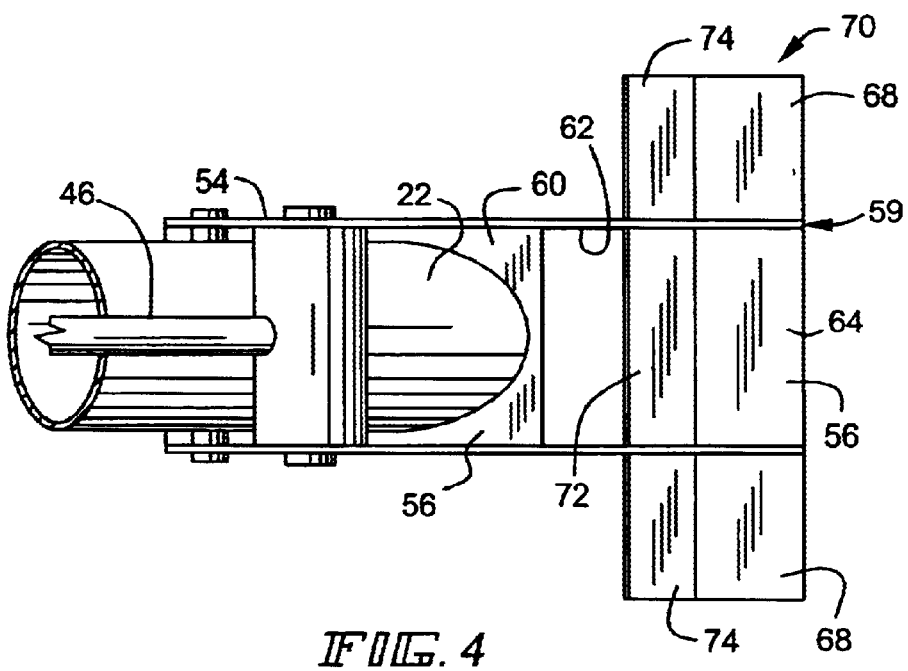
FIG. 4 is a bottom view of the planar bottom chute showing a hole through which grass seed or a grass seed mixture will fall when a handle assembly of the device is manipulated by an operator.

As best shown in FIGS. 3 and 4, the planar bottom chute 26 has a generally U-shaped cross-section defined by the bottom plate 56 and spaced apart side walls 58 which extend upwardly to the upper end 54 and then angularly downwardly to a front end 59 of the planar bottom chute 26. The bottom plate 56 has a rear portion 60 which is generally rectangular in shape for resting against the oval-shaped end surface 24 of the short end section 22. Then, in front of this rectangular shaped rear plate portion 60 is an opening 62 through which grass seed or a mixture of seed can fall over a divot or a bare area in a grass surface.

A front planar portion 64 of the bottom plate 56 extends from the opening 62 to the front end 59 of the side walls 58 and transversely or laterally outwardly extending plate extensions 68 are provided to provide a wide trowel formation 70 for leveling a seed or seed mix over the divot or bare area when the device is pulled back over the divot or open area in the grass surface.

Additionally, an inclined fin 72 extends angularly upwardly and rearwardly from the front planar portion 64 of the bottom plate 56 at the edge of the opening 62 and fin extensions 74 extend in line with the fin 68 from each of the side walls 40, as shown. This enables flattening of the seed mix level with the existing turf when the device 10 is pulled rearwardly.

Figure 7:
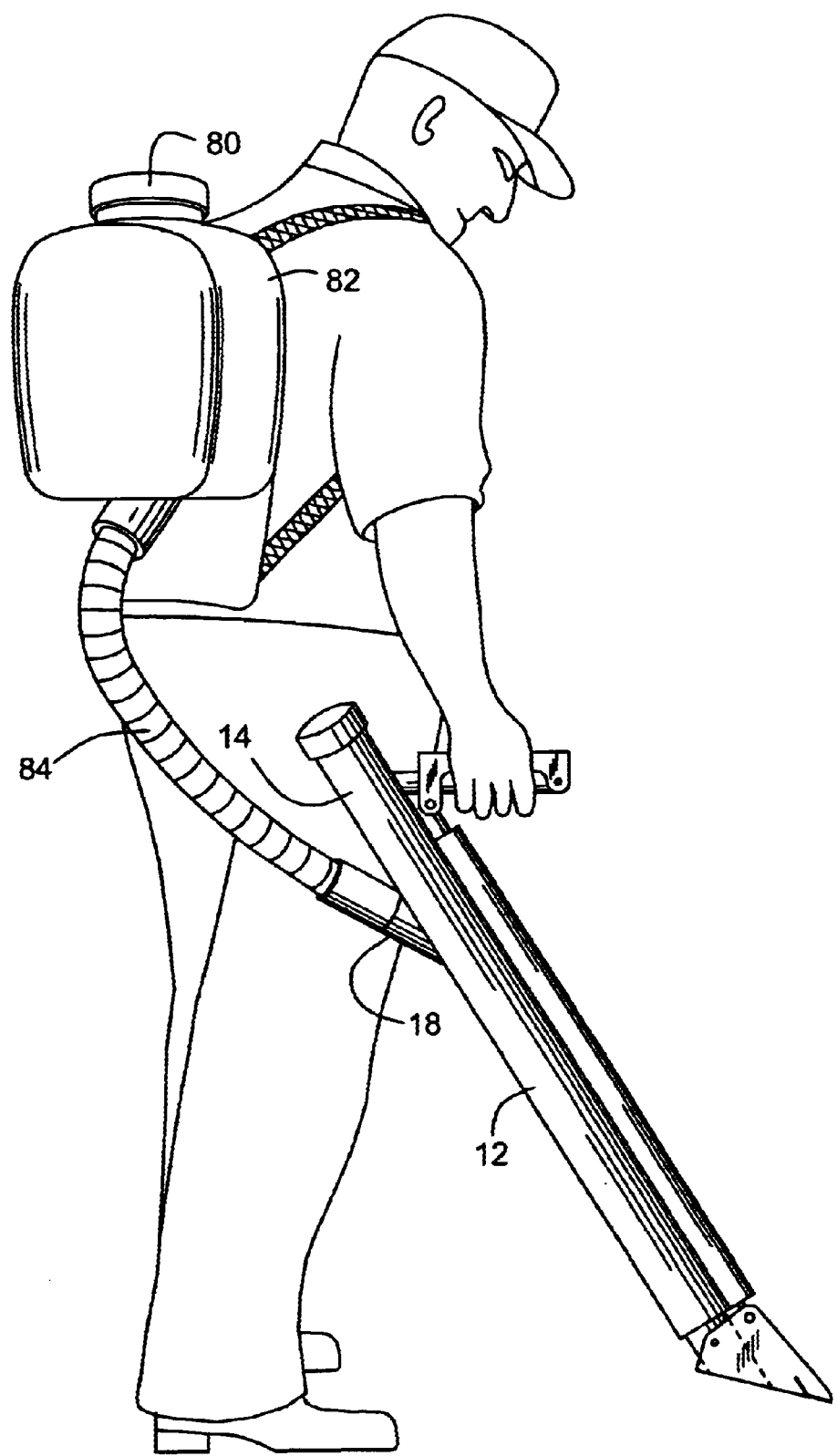
FIG. 7 is an elevational view of person carrying a backpack mounting a container which is connected by a hose to the device.

The divot filling and leveling device 10 of the present invention has a number of advantages, some of which have been described above and others of which are inherent in the invention. First of all, it is a very simple device for patching bare areas in a grass surface, such as divots. Secondly, while the tube 12 of the device 10 provides a large reservoir for grass seed or a grass seed mixture, an even larger reservoir is provided with a container 80 mounted in a backpack 82 and attached by a flexible hose 84 to the port 18, as shown in FIG. 7.

Further, the planar bottom chute 26, the linkage rod 40 and the handle assembly 26 allow the planar bottom chute 26 to be urged against the oval shaped end surface 24 at the bottom of the tube 12 when the device 10 is not in use and enables an operator to simply and quickly drop a small amount of seed or seed mixture over a bare area or divot by squeezing the handle assembly 28 which opens the bottom end 24 of the tube 12 for dropping grass seed through the opening 62 after which the front planar portion 64 and extensions 68 providing the trowel formation 70 which enables the flattening of the seed mix which has been deposited over a bare area in a grass surface, such as a divot, by simply pulling or dragging the device 10 backward as the trowel formation 70 at the front end of the bottom chute 26 is pulled over the seed mixture just deposited.

Stated another way, (1) the device 10 enables an operator to remain in a comfortable upright position while using the device 10; (2) the backpack container connected via a flexible hose to the device 10 enables a large amount of seed or seed mixture to be carried by the operator; (3) the angle of the tube 12 allows the operator to easily seed the mixture being applied to the divot; (4) the design of the planar bottom chute 26 with a large trowel formation 70 allows the divot to be filled smooth and level to the adjacent grass; and (5) the divot is filled and leveled in one simple action making the divot filling more precise and saving an operator's time and the amount of seed mixture used.

Also, it will be understood that modifications can be made to the divot filling and leveling device 10 of the present invention without departing from the teachings of the present invention. Accordingly, the scope of the invention is only to be limited and necessitated by the accompanying claims.

I claim:

1. A device for filling and leveling open areas in a grass surface comprising:

a tube having an upper end and a lower end;

a planar bottom chute having a U-shaped or channel cross-section, including a bottom plate and upwardly extending, spaced apart side walls and extending across said lower end of the tube, said planar bottom chute being pivotally mounted to said lower end of said tube and said side walls straddling said lower end of said tube;

a handle assembly mounted at an upper end of said tube;

a linkage mechanism connected between said handle assembly and said planar bottom chute; and biasing means for biasing said handle assembly to exert a pulling force on said linkage mechanism to hold the planar bottom chute closely against said lower end of said tube whereby an operator can manipulate the handle assembly for moving said planar bottom chute toward and away from said lower end of said tube for opening and closing said tube to facilitate dispensing grass seed or a grass seed and earth mixture from said lower end of said tube, and can level the seed or seed mixture with said planar bottom chute.

2. The device of claim 1 wherein said handle assembly includes:

a strut that is rigidly fixed to said tube at said upper end thereof and extends outwardly from said tube;

an arm having a U-shaped or channel cross-section which is pivotally connected to an outer end of said strut such that sides of said arm straddle said strut, the sides at said rear end of said arm extending downwardly below said strut and having a pin connected therebetween which is connected to an upper end of said linkage mechanism; and said biasing means includes a compression spring positioned between said strut and said arm for biasing said arm upwardly away from said strut, thereby urging said linkage mechanism upwardly to hold said planar bottom chute against a lower end of said tube.

3. The device of claim 2 wherein said strut extends at an angle downwardly from said tube.

4. The device of claim 1 wherein said linkage mechanism is a linkage rod.

5. The device of claim 1 wherein said linkage mechanism is covered by a cover that is fixed to an outer surface of said tube.

6. The device of claim 5 wherein said cover is a tube.

7. The device of claim 1 wherein said lower end of said tube is inclined so as to present an oval end surface at the lower end of said tube which is engaged by an upper surface of said bottom plate.

8. The device of claim 7 wherein said bottom plate has a rear planar portion which forms a cover closure for the lower end of said tube and a front planar portion which forms part of a trowel formation with an opening being provided between said rear planar portion and said front planar portion through which opening grass seed falls when the device is opened.

9. The device of claim 8 wherein said trowel formation includes an inclined fin which extends angularly upwardly from said front planar portion adjacent said opening.

10. The device of claim 9 wherein said trowel formation includes transversely extending side fin extensions which extend outwardly from the outer surface of each side wall of said planar bottom chute adjacent said inclined fin.

11. The device of claim 8 wherein said trowel formation includes transversely extending front side planar portion extensions which extend outwardly from the outer surface of each side wall of said planar bottom chute adjacent said front planar portion.

12. The device of claim 1 wherein a side port is provided in said tube at an upper end thereof for connection via a flexible hose to a container carried in a backpack worn by an operator to provide a reservoir of grass seed or grass seed mixture.

\* \* \* \* \*